US00RE34925E

United States Patent [19]

McKeighen

[11] E Patent Number: Re. 34,925

[45] Reissued Date of Patent: May 2, 1995

[54] GOLF CLUB HEAD

[76] Inventor: James F. McKeighen, 1293 Calma Ct., Vista, Calif. 92038

[21] Appl. No.: 85,578

[22] Filed: Jun. 29, 1993

Related U.S. Patent Documents

Reissue of:

[64] Patent No.: 5,028,049
Issued: Jul. 2, 1991
Appl. No.: 428,821
Filed: Oct. 30, 1989

[51] Int. Cl.[6] ..... A63B 53/04

[52] U.S. Cl. ..... 273/167 H; 273/167 J; 273/172

[58] Field of Search ..... 273/77 R, 167 R, 167 A, 273/167 B, 167 C, 167 D, 167 E, 167 F, 167 G, 167 H, 167 J, 167 K, 168, 169, 170, 171, 172, 173, 174, 175, 78, 193 R, 194 R, 164.1, 77 A; D21/214

[56] References Cited

U.S. PATENT DOCUMENTS

| | | | |
|---|---|---|---|
| 3,834,700 | 9/1974 | Averbach | 273/77 R |
| 4,432,549 | 2/1984 | Zebelean | 273/167 H |
| 4,489,945 | 12/1984 | Kobayashi | 273/167 H |
| 4,602,787 | 7/1986 | Sugioka | 273/171 |
| 4,687,205 | 8/1987 | Tominaga | 273/169 |
| 4,749,197 | 6/1988 | Orlowski | 273/173 |
| 4,754,969 | 7/1988 | Kobayashi | 273/77 A |
| 4,768,787 | 9/1988 | Shira | 273/175 |
| 4,811,950 | 3/1989 | Kobayashi | 273/171 |
| 4,824,110 | 4/1989 | Kobayashi | 273/78 |

FOREIGN PATENT DOCUMENTS

| | | | |
|---|---|---|---|
| 211781 | 12/1957 | Australia | 273/167 H |
| 595117 | 1/1978 | Switzerland | 273/167 H |
| 29603 | of 1914 | United Kingdom | 273/169 |

*Primary Examiner*—Sebastiano Passaniti

[57] ABSTRACT

A golf club driver head comprises an empty hollow body of general golf club driver shape having a front striking face, a bottom sole plate, an upper wall, a rounded rear wall, a heel, a toe, and a neck extending from the heel to attach the head to a shaft. The body is formed entirely from cast titanium or titanium alloy, and has an average striking face thickness of at least 0.2 inches, which is thicker than standard metallic driver heads. The striking face is preferably much thicker than the remainder of the body to move the center of gravity closer to the striking face, and is thicker around its perimeter than at its center.

24 Claims, 1 Drawing Sheet

GOLF CLUB HEAD

Matter enclosed in heavy brackets [ ] appears in the original patent but forms no part of this reissue specification; matter printed in italics indicates the additions made by reissue.

BACKGROUND OF THE INVENTION

This invention relate generally to golf clubs, and more particularly to golf clubs of the so-called "wood" type.

Golf clubs are generally divided into three main types, comprising putters, irons, and drivers. In the past, drivers conventionally had heads made of solid wood. Thus, they are often referred to as wood drivers, or simply as "woods." Over the years, the heads of wood drivers have been refined into a classic shape including a generally flat impact face, rounded upper and rear walls, and a relatively flat sole plate. Wood drivers have some disadvantages since wood is susceptible to chipping, scratching, and other damage. Additionally, the wooden head, once formed, is fixed in weight and other properties.

In view of the disadvantages of drivers having wooden heads, drivers having metallic heads have been developed in recent years. Such heads are commonly fabricated as a hollow steel shell. However, steel heads cannot be fabricated in the old or classic wooden shape since they would then exceed the maximum weight parameter of approximately 200 to 215 grams total head weight. Additionally, the steel shell must be relatively thin to avoid excessive weight, so that it has to be filled with various densities of foam material in order to avoid a highly undesirable clanking sound as the head strikes the ball.

SUMMARY OF THE INVENTION

It is an object of this invention to provide an improved wood type or driver golf club head.

According to the present invention, a golf club head is provided which comprises an empty, hollow all-metal body shaped in the form of a golf club driver head, the body having a front striking face, an upper wall, a bottom wall, a rounded rear wall, a toe and a heel, and a hollow neck extending upwardly from the heel of the body at a selected angle, the body being formed entirely of cast titanium or titanium alloy, and the front striking face having an average thickness of at least 0.2 inches. The walls of the hollow titanium body can be made thicker than those of a standard steel golf club head, since titanium is around 45% lighter in weight than steel. This added thickness or volume avoids or reduces the undesirable "clanking" sound, so that it is not necessary to fill the hollow body with foam or other sound dampening material. This results in an additional weight saving of the order of around 10 grams, which can be utilized in additional thickness and weight distribution on the front, striking face. Alternatively, or additionally, the head itself can be made larger than a standard steel head in view of the lighter weight material used and the elimination of the material filling the body, making a larger striking face and thus a larger "sweet spot". In the preferred embodiment of the invention, the head dimensions can be up to 30% larger than those of a standard steel golf club head.

In the preferred embodiment of the invention, the thickness of the striking face is much greater than that of the remainder of the head, so that most of the weight is at the front. This brings the center of gravity closer to the front of the head, or the striking face. Preferably, the striking face is thicker around the majority of its perimeter than in the central area, with the wall being thickened gradually or radiused towards its upper edge and outer side edges.

Preferably, the bottom wall of the head has an opening into which a cast metal sole plate of titanium or similar metal is welded. Sole plates in a range of thicknesses are provided to control the weight of the head by swing weight increments. In the preferred embodiment of the invention, sole plates increasing in thickness in steps of 0.006 inches are provided. This provides a broad spectrum of swingweights necessary to satisfy the requirements of golfers of every skill and strength level, without significantly altering the characteristics or weight distribution of the head as does the addition of weights in the neck or via insertion of small brass or lead weights in the tip end of the shaft prior to insertion in the head.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 3:
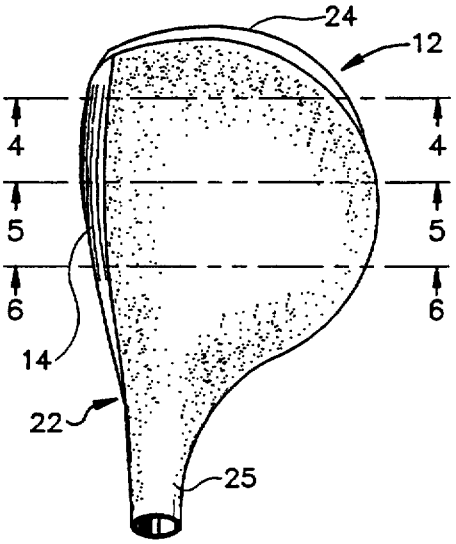
FIG. 3 is a top plan view of the head.
Figure 1:
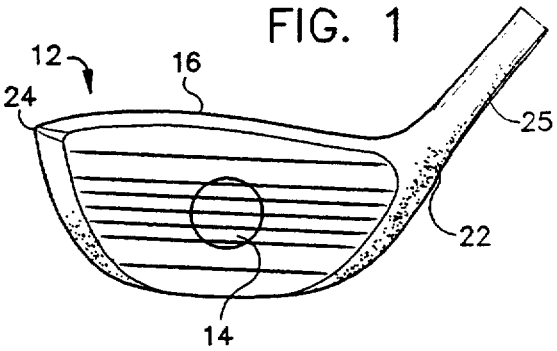
FIG. 1 is a front elevational view of a golf club driver head according to a preferred embodiment of the present invention.
Figure 2:
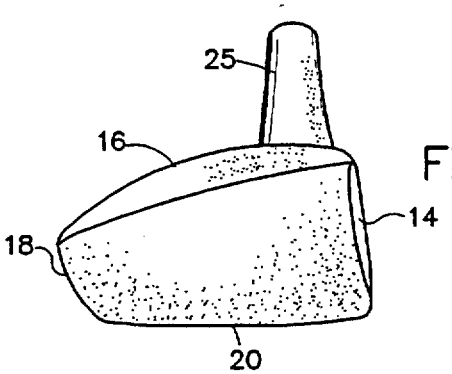
FIG. 2 is a side elevational view of the head.

The drawings illustrate a golf club driver or wood style head 10 according to a preferred embodiment of the present invention. The head basically comprises an empty, hollow body 12 of cast titanium, or high grade titanium alloy such as 6AL-4VA, having a front, striking face 14, an upper wall 16, a rear wall 18, a bottom wall 20, a heel 22 and a toe 24, with a hollow neck 25 extending from the heel 22 at a predetermined angle for attachment to the golf club shaft (not illustrated). The head is formed with the shape of a conventional golf club driver head, but is preferably of larger dimensions than conventional heads.

The bottom wall has an opening extending over the majority of its area in which a sole plate 26 is welded. Sole plate 26 is preferably also of cast titanium, and sole plates in a range of thickness are provided to control the weight of the head and provide a range of different heads whose weights vary by small increments. Preferably, sole plates increasing in thickness by 0.006 inches per unit (or 2 gram increments) are provided, which results in golf clubs in one swingweight increments. This has been found to be the most efficient place to provide a relatively uniform adjustment in individual golf club heads. The selected sole plate is welded into the head prior to the finish sanding.

The overall size of the head 10 is larger than that of a standard stainless steel driver head, and the wall thickness is increased to avoid the necessity of filling the head with a noise dampening foam. The weight of the head is about 200 grams, which is about the same as that of a standard stainless steel head, but the striking face can be made both thicker and larger, and thus a larger sweet spot can be provided. In a preferred embodiment of the invention, the height of the striking face was about 1.625 inches while the maximum width was up to 4 inches.

Figure 4:
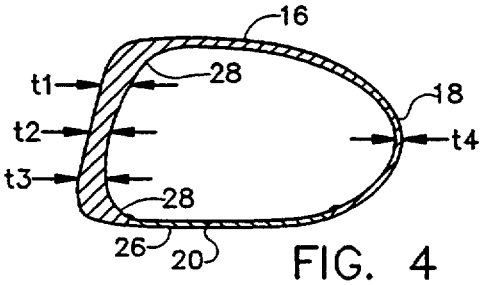
FIG. 4 is a cross-section on the lines 4—4 of FIG. 3.
Figure 5:
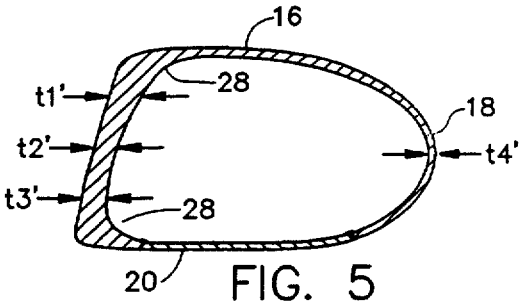
FIG. 5 is a cross-section on the lines 5—5 of FIG. 3.
Figure 6:
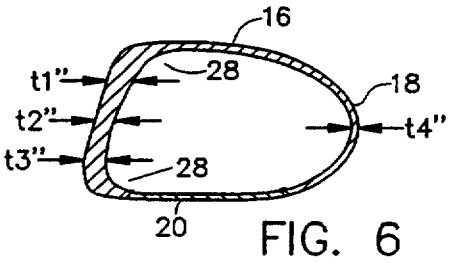
FIG. 6 is a cross-section on the lines 6—6 of FIG. 3.

FIGS. 4, 5 and 6 illustrate the variation in the thickness of the striking face over its area. The striking face has an average thickness of at least 0.2 inches to avoid or reduce clanking noise when a ball is struck, while the remainder of the body has a wall thickness of around 0.042 inches. Thus the majority of the weight is to the front, moving the center of gravity closer to the front face, which improves the ball striking properties. The striking face is not of uniform thickness but is generally thicker around its perimeter than in the central area, in a manner generally designed to strengthen the head, reducing the risk of damage on impact, and to increase the sweet spot and move the center of gravity closer to the front of the striking face. The various thickness dimensions indicated in FIGS. 4 to 6 in a preferred embodiment of the invention are given below in inches

| | | |
|---|---|---|
| t1 = 0.400 | t1′ = 0.350 | t1″ = 0.380 |
| t2 = 0.360 | t2′ = 0.250 | t2″ = 0.350 |
| t3 = 0.320 | t3′ = 0.220 | t3″ = 0.320 |
| t4 = 0.042 | t4′ = 0.042 | t4″ = 0.042 |

As can be seen, the thickness of the striking face flares towards its outer side edges and towards its upper edge by means of interior radiused or flared regions 28, the front surface of face being substantially flat over its entire area to provide a large striking area. This further expands the sweet spot and results in a head which produces superior results even for slightly mis-struck or off center shots. The maximum thickness is located at the upper corner regions 30,32 of the striking face, with the thickness varying around the perimeter between 0.22 at the center of the lower edge and 0.4 inches at the upper corner at the toe end of the head.

By forming the hollow body of the golf club entirely of relatively lightweight titanium or titanium alloy, the weight distribution over the front face can be improved by increasing its thickness overall and suitably varying the thickness of the front wall. This also moves the center of gravity forward towards the front, striking face. Additionally, the overall size of the head can be increased, producing a corresponding increase in the sweet spot and reduction in the member "mis-struck" shots, and the wall thickness over the entire body can be increased to avoid the necessity of filing the hollow body with any noise reducing material, the added thickness increasing its rigidity and reducing the vibration when a ball is struck. The provision of a wide range of different weight and thickness sole plates for selectively welding onto the main body allows finished golf clubs in a broad range of swingweights to be provided to satisfy the individual requirements of golfers of every skill and strength level.

This utilization of various weight sole plates for swingweight adjustments replaces the highly undesirable but standard approach of inserting various lead or brass weights into the tip of the shaft or into the neck area during club assembly.

Although a preferred embodiment of the invention has been described above by way of example only, it will be understood by those skilled in the field that modifications may be made to the disclosed embodiment without departing from the scope of the invention, which is defined by the appended claims.

I claim:

1. A golf club head, comprising:

an integral, empty hollow body, the body having a front striking face, a bottom wall, an upper wall, a rounded rear wall, a heel, a toe, and an integral hollow neck extending upwardly from the heel of said body at a predetermined angle for attaching said golf club head to a shaft;

said body and neck being formed entirely of cast titanium or titanium alloy; and said front striking face having a thickness which varies across its area and is thinnest at the geometrical center of the striking face and thickest around the entire periphery of the striking face; and said striking face having upper, lower, and side peripheral edges *defining corners* and the thickness of the striking face varying around its outer periphery and [is] *being* thicker at the corners of the peripheral edges than at the center of each peripheral edge.

2. The golf club head as claimed in claim 1, wherein the bottom wall has an opening extending over the majority of its area and the body is cast in two parts, one part comprising a sole plate welded around the peripheral edge of the opening in the bottom wall and the other part comprising the remainder of the body.

3. The golf club head as claimed in claim 2, wherein sole parts are provided in a range of selected thicknesses for selectively welding to the bottom wall opening, the thickness of the sole plates increasing incrementally by a predetermined amount.

4. The golf club head as claimed in claim 3, wherein the sole plate thicknesses increase in increments of around 0.006 inches.

5. The golf club head as claimed in claim 1, wherein the thickness at the upper edge of the striking face is between 0.35 and 0.4 inches.

6. The golf club head as claimed in claim 1, wherein the wall thickness of the upper and rear walls is between 0.04 and 0.45 inches.

7. The golf club head as claimed in claim 1, wherein the wall thickness at the center of the striking face is around 0.25 inches.

8. The golf club head as claimed in claim 1, wherein the wall thickness at the side edges of the striking face is in the range from 0.3 to 0.4 inches.

9. The golf club head as claimed in claim 1, wherein the wall thickness at the lower edge of the striking face is in the range from 0.2 to 0.35 inches.

10. The golf club head as claimed in claim 1, wherein the striking face is thickest at [the] *an* upper corner of the peripheral edge at the toe end of the striking face.

11. A golf club, comprising:

an elongated shaft;

a head secured to one end of the shaft, the head comprising an empty hollow body having a front striking face, an upper wall, a rear wall, a lower wall, a heel and a toe, and a neck projecting from the heel to secure the head to the shaft;

the head being formed entirely of a light weight metal which is at least 40% lighter in weight than steel;

the front striking face having an average thickness at least four times that of the remainder of the head; and the thickness of the striking face varying from its outer perimeter towards its geometrical center, the striking face being thinnest at its center and thicker around the entire periphery of the striking face than at the center, the thickness varying around the periphery of the face and being thinner at the center of each edge of the face than at the outermost ends of the respective edge.

12. The golf club as claimed in claim 11, wherein the front of the striking face is substantially flat and the varying thickness is provided by a radiused contour of [the] *an* inside surface of the striking face towards [the] upper and outer side edges of the striking face.

*13. A golf club head, comprising:*

*an integral, empty hollow body, the body having a front striking face, a bottom wall, an upper wall, a rounded rear wall, a heel, a toe, and an integral hollow neck extending upwardly from the heel of said body at a predetermined angle for attaching said golf club head to a shaft;*

*said body and neck being formed entirely of cast titanium or titanium alloy; and*

*said front striking face having a thickness which varies across its area and is thinnest all the center of the striking face and thickest around the entire periphery of the striking face.*

*14. The golf club head as claimed in claim 13, wherein the bottom wall has an opening extending over the majority of its area and the body is cast in two parts, one part comprising a sole plate welded around the peripheral edge of the opening in the bottom wall and the other part comprising the remainder of the body.*

*15. The golf club head as claimed in claim 14, wherein sole parts are provided in a range of selected thicknesses for selectively welding to the bottom wall opening, the thickness of the sole plates increasing incrementally by a predetermined amount.*

*16. The golf club head as claimed in claim 15, wherein the sole plate thicknesses increase in increments of around 0.006 inches.*

*17. The golf club head as claimed in claim 13, wherein the thickness at an upper edge of the striking face is between 0.35 and 0.4 inches.*

*18. The golf club head as claimed in claim 13, wherein the wall thickness of the upper and rear walls is between 0.04 and 0.45 inches.*

*19. The golf club head as claimed in claim 13, wherein the wall thickness at the center of the striking face is around 0.25 inches.*

*20. The golf club head as claimed in claim 13, wherein the wall thickness at an side edges of the striking face is in the range from 0.3 to 0.4 inches.*

*21. The golf club head as claimed in claim 13, wherein the wall thickness at the lower edge of the striking face is in the range from 0.2 to 0.35 inches.*

*22. The golf club head as claimed in claim 13, wherein the striking face is thickest at an upper corner of the peripheral edge at the toe end of the striking face.*

*23. A golf club, comprising:*

*an elongated shaft;*

*a cast head secured to one of the shaft, the head comprising an empty hollow body having a front striking face, an upper wall, a rear wall, a lower wall, a heel and a toe, and a neck projecting from the heel to secure the head to the shaft;*

*the head being formed entirely of a light weight metal which is at least 40% lighter in weight than steel; and*

*the thickness of the striking face varying from its outer perimeter towards its center, the striking face being thinnest at its center.*

*24. The golf club as claimed in claim 23, wherein the front of the striking face is substantially flat and the varying thickness is provided by a radiused contour of the inside surface of the striking face towards the upper and outer side edges of the striking face.*

* * * * *